United States Patent
Asokan

(10) Patent No.: US 9,473,342 B2
(45) Date of Patent: Oct. 18, 2016

(54) METHODS, SYSTEMS, AND COMPUTER READABLE MEDIA FOR SINGLE AND MULTI-CARRIER DOWNLINK AND UPLINK CONTROL INFORMATION RESOLUTION

(71) Applicant: Ixia, Calabasas, CA (US)

(72) Inventor: Ramanathan Asokan, Cary, NC (US)

(73) Assignee: Ixia, Calabasas, CA (US)

(*) Notice: Subject to any disclaimer, the term of this patent is extended or adjusted under 35 U.S.C. 154(b) by 547 days.

(21) Appl. No.: 13/826,862

(22) Filed: Mar. 14, 2013

(65) Prior Publication Data

US 2014/0269527 A1 Sep. 18, 2014

(51) Int. Cl.
*H04L 5/00* (2006.01)
*H04L 27/26* (2006.01)

(52) U.S. Cl.
CPC ........... *H04L 27/2647* (2013.01); *H04L 5/001* (2013.01)

(58) Field of Classification Search
USPC .................................................. 370/329, 330
See application file for complete search history.

(56) References Cited

U.S. PATENT DOCUMENTS

| | | | |
|---|---|---|---|
| 2010/0098012 A1* | 4/2010 | Bala et al. | 370/329 |
| 2011/0237270 A1* | 9/2011 | Noh et al. | 455/450 |
| 2012/0063413 A1* | 3/2012 | Kroener et al. | 370/330 |
| 2012/0155337 A1* | 6/2012 | Park | 370/280 |
| 2013/0262953 A1* | 10/2013 | Deng et al. | 714/752 |

OTHER PUBLICATIONS

Dahlman et al, "Chapter 10: Downlink Physical-Layer Processing—Chapter 11: Uplink Physical Layer Processing," 4G LTE/LTE-Advanced for Mobile Broadband, pp. 143-246 (Copyright 2011). (Part 1 of 2, pp. 143-202).

Dahlman et al, "Chapter 10: Downlink Physical-Layer Processing—Chapter 11: Uplink Physical Layer Processing," 4G LTE/LTE-Advanced for Mobile Broadband, pp. 143-246 (Copyright 2011). (Part 2 of 2, pp. 203-246).

"LTE CA: Carrier Aggregation Tutorial," http://www.radio-electronics.com/info/cellulartelecomms/lte-long-term-evolution/4g-lte-advanced-carrier-channel-aggregation.php, pp. 1-7 (Downloaded from the Internet Mar. 14, 2013).

* cited by examiner

*Primary Examiner* — Dang Ton
*Assistant Examiner* — Pamit Kaur
(74) *Attorney, Agent, or Firm* — Jenkins, Wilson, Taylor & Hunt, P.A.

(57) ABSTRACT

The subject matter described herein includes methods, systems, and computer readable media for single and multi-carrier downlink and uplink control information resolution. A method for downlink and uplink control information resolution includes receiving a downlink signal including downlink control information and uplink control information. The downlink signal is processed to segregate at least some of the downlink control information in the signal from the uplink control information in the signal. The segregated downlink control information is processed using downlink control information processing resources. The uplink control information in the signal is processed using uplink control information processing resources.

19 Claims, 5 Drawing Sheets

METHODS, SYSTEMS, AND COMPUTER READABLE MEDIA FOR SINGLE AND MULTI-CARRIER DOWNLINK AND UPLINK CONTROL INFORMATION RESOLUTION

TECHNICAL FIELD

The subject matter described herein relates to decoding downlink and uplink control information. More particularly, the subject matter described herein relates to methods, systems, and computer readable media for single and multi-carrier downlink and uplink control information resolution.

BACKGROUND

In wireless communications networks, such as long term evolution (LTE) networks, the downlink signal transmitted from the network to the user equipment contains downlink and uplink control information. It is the responsibility of the user equipment or the user equipment simulator to correctly process the downlink and uplink control information in sufficient time to decode the corresponding downlink signal and to generate the corresponding uplink signal. In one exemplary multi-UE simulator architecture, a control DSP has been tasked with processing the control information in the downlink signal. The control DSP may have separate cores, which may be used to process uplink and downlink control information. Because the downlink signal includes both uplink and downlink control information, it is desirable to efficiently segregate the processing of this information so that the benefit of a multi-core DSP can be fully utilized.

In LTE networks, carrier aggregation further complicates the processing of the downlink signal. Carrier aggregation refers to multiple different signal carriers in the same or different frequency bands being used in the same downlink signal. When carrier aggregation is utilized and different processing resources are used to process downlink signals transmitted on different carriers, it is desirable to identify and separate signals on a per carrier basis. For example, in LTE carrier aggregation, a receiver that designated for carrier 1 may receive control information for carrier 1 and carrier 2. If the processing resources in a device, such as a multi-UE simulator, are segregated on a per carrier basis, it is desirable to have an efficient mechanism for delivering data carried on different signal carriers to the proper processing resources.

Accordingly, in light of these difficulties, there exist a need for methods, systems, and computer readable media for single and multi-carrier downlink and uplink control information resolution.

SUMMARY

The subject matter described herein includes methods, systems, and computer readable media for single and multi-carrier downlink and uplink control information resolution. A method for downlink and uplink control information resolution includes receiving a downlink signal including downlink control information and uplink control information. The downlink signal is processed to segregate at least some of the downlink control information in the signal from the uplink control information in the signal. The segregated downlink control information is processed using downlink control information processing resources. The uplink control information in the signal is processed using uplink control information processing resources.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
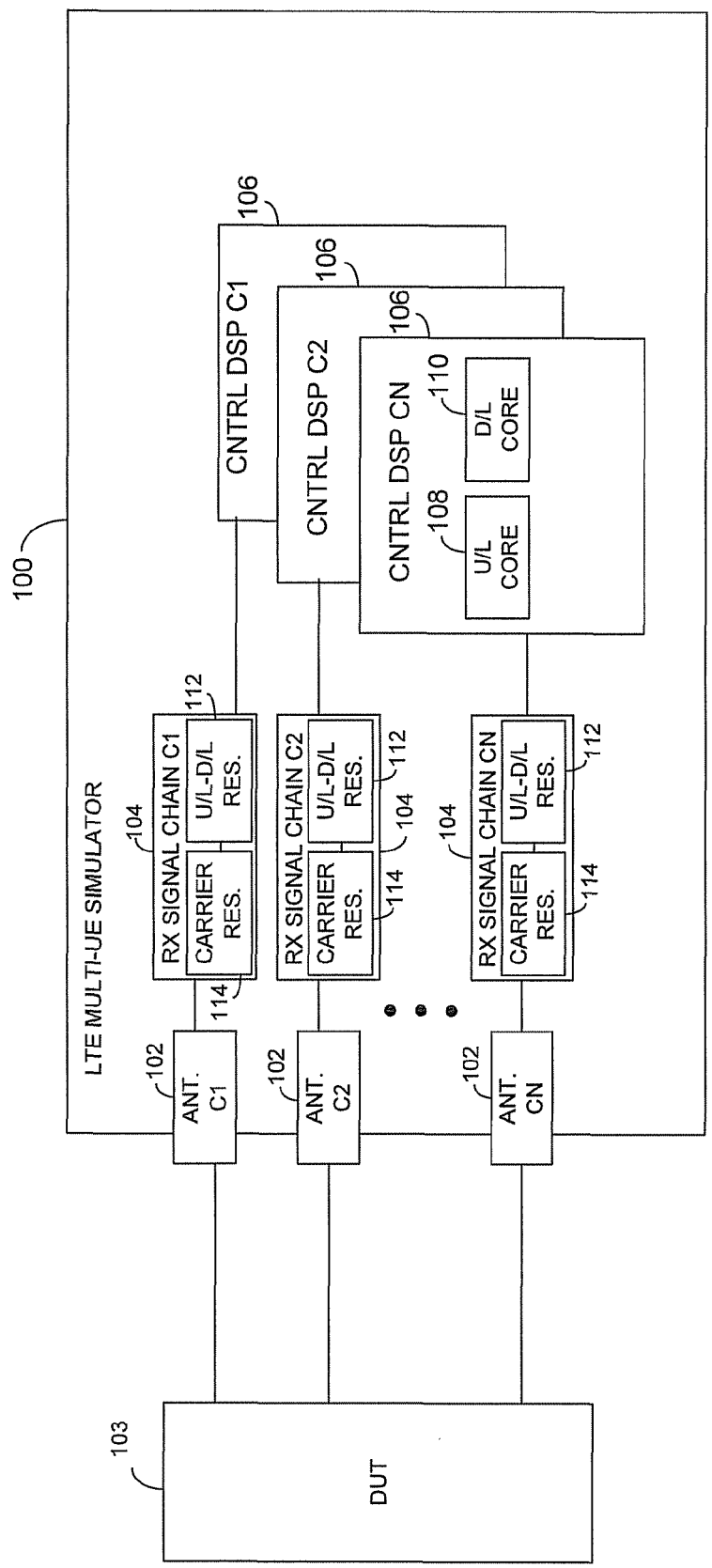
FIG. 1 is a block diagram of an LTE multi-UE simulator for single and multi-carrier downlink and uplink control information resolution according to an embodiment of the subject matter described herein.

Methods, systems, and computer readable media for single and multi-carrier downlink and uplink control information resolution are disclosed. FIG. 1 is a block diagram of a multi-UE simulator for performing single and multi-carrier downlink and uplink control information resolution according to an embodiment of the subject matter described herein. Referring to FIG. 1, multi-UE simulator 100 includes a plurality of antenna interfaces 102 that transmit signals to and from device under test 103. Antenna interfaces 102 may be actual radio interfaces capable of transmitting data to and receiving data from DUT 103 over wireless links. Alternatively, antenna interfaces 102 may be wired interfaces, such as common public radio interface (CPRI) interfaces that transmit data to and receive data from DUT 103 over wired links that are intended to simulate wireless links. Device under test 103 may be any suitable radio network element, such as an eNode B. Simulator 100 also includes receive signal chain processing resources 104 that perform symbol and various channel processing functions on a per-carrier basis for a multi-carrier downlink signal. In the illustrated example, receive signal chain processing resources 104 are provided for carriers C1-CN, where N is an integer equal to the number of carriers.

Multi-UE simulator 100 includes a plurality of digital signal processors (DSPs) 106 that perform uplink specific and downlink specific processing of downlink signals. As with the receive signal chain processing resources 104, DSPs 106 are provided on a per carrier basis for separately processing signals carried on different carriers C1-CN. In the illustrated example, each DSP 106 includes multiple cores including an uplink core 108 for processing uplink control information and a downlink core 110 for processing downlink control information. Additional components of multi-UE simulator 100 include turbo decoders and resources for processing MAC and radio link control information but are not illustrated in FIG. 1, as they are not necessary to illustrate the functionality of the subject matter described herein.

According to one aspect of the subject matter described herein, each receive signal chain processing resource 104 includes an uplink/downlink control information segregation function 112 that segregates uplink control information and downlink control information from a received downlink signal and a carrier control information segregation function 114 that segregates control information for different carriers and provides the carrier specific control information to the appropriate carrier specific DSP 106. The operation of both of these functions will now be described in detail.

Figure 2A:
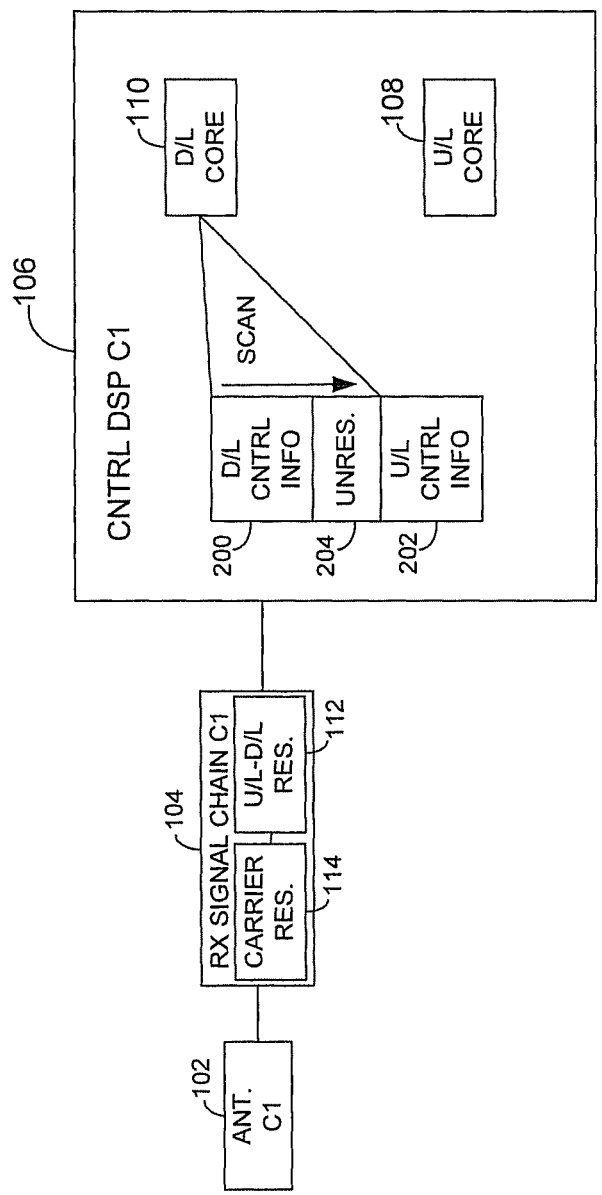
FIGS. 2A and 2B are block diagrams illustrating exemplary uplink and downlink control information resolution for the single carrier case according to an embodiment of the subject matter described herein.
Figure 2B:
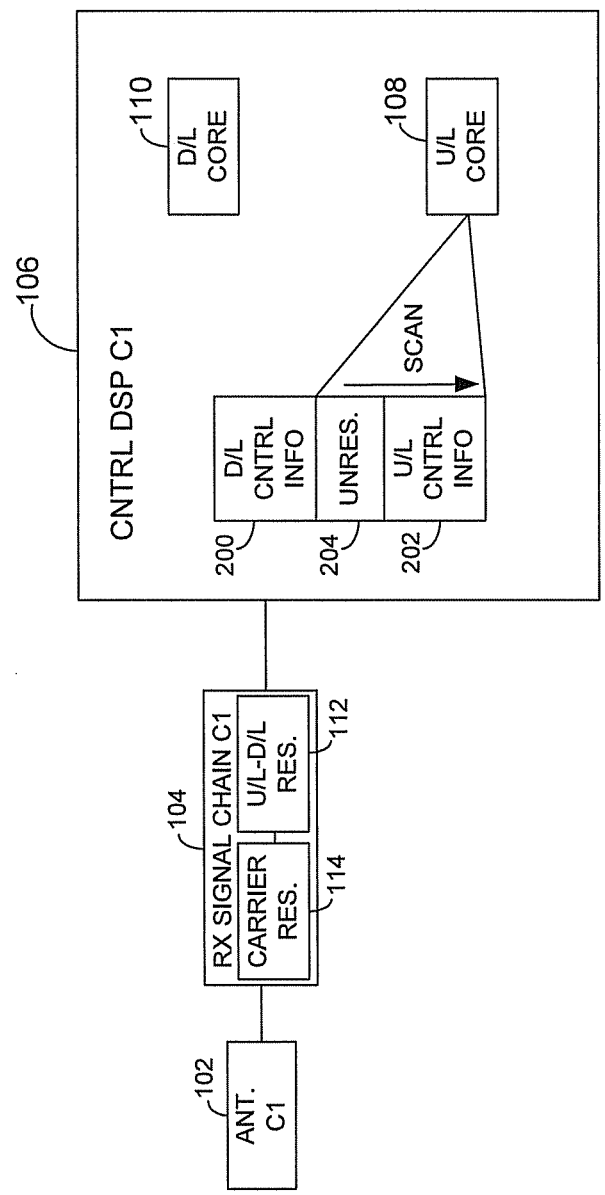

Referring to FIG. 2A, receive signal chain processing resources 104 for a single carrier, C1, are illustrated. Uplink/downlink control information segregation function 112 processes the downlink signal into downlink control information 200, uplink control information 202, and unresolved control information 204 that cannot be initially identified as uplink or downlink control information. Uplink/downlink control information segregation function 112 may initially segregate the uplink control information from the downlink control information based on the lengths of various parameter values. For parameters for which parameter value lengths cannot be used to segregate the uplink control information from the downlink control information, uplink/downlink control information segregation function 112 may examine values of the various parameters to determine whether the value is part of the uplink control information or the downlink control information. Uplink/downlink control information segregation function 112 provides the segregated control information to control DSP 106, for example, by writing the data to separate portions of shared memory accessible by control DSP 106. Downlink core 110 processes downlink control information 200 and unresolved control information 204. Because downlink core 110 is not required to process uplink control information 202, control DSP 106 are preserved and takes less processing time. Similarly, as illustrated in FIG. 2B, uplink core 108 processes only the unresolved control information 204 and uplink control information 202. Because uplink core is not required to process the downlink control information 200, control DSP resources are conserved and takes less processing time.

Figure 3:
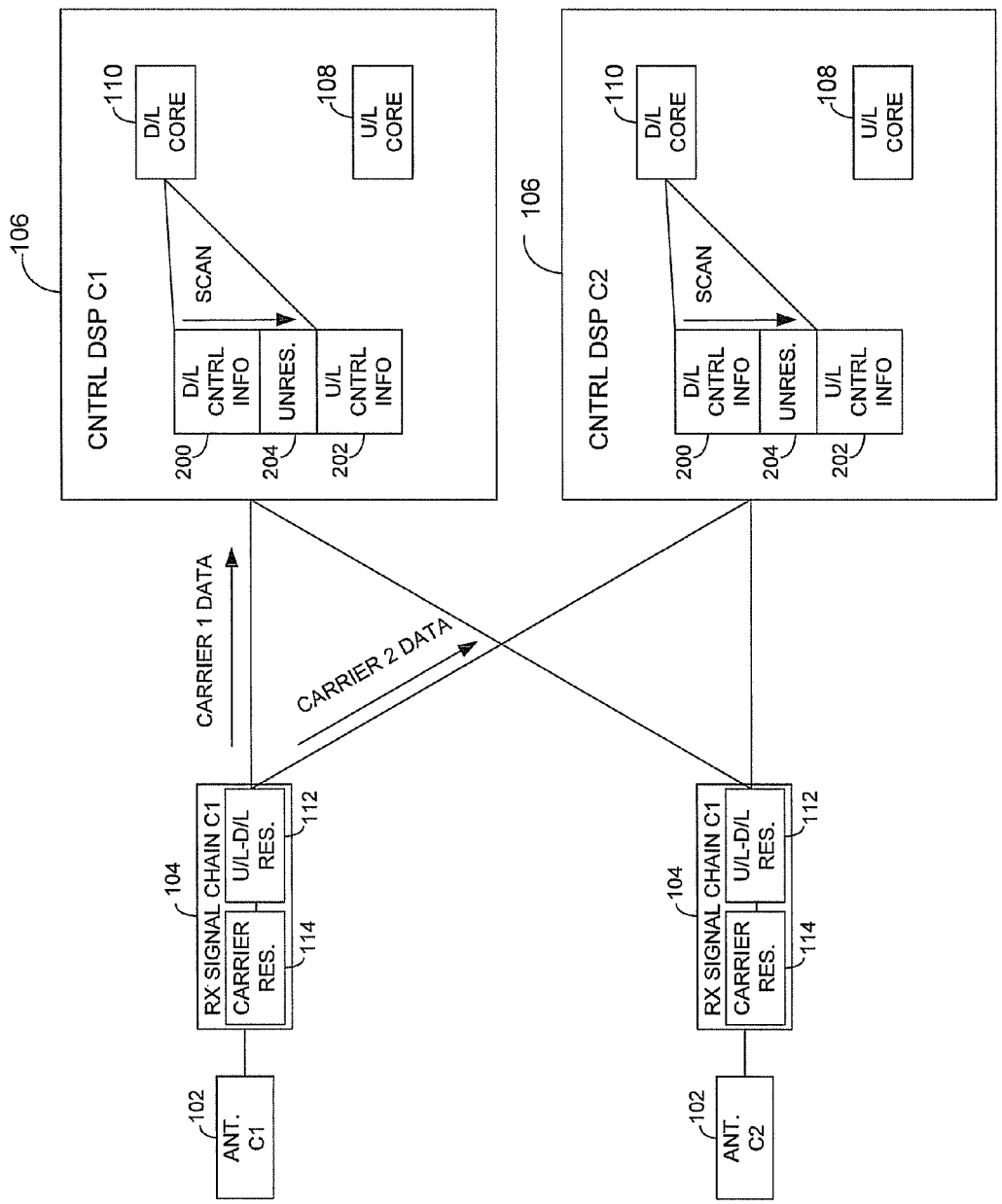
FIG. 3 is illustrates uplink and downlink control information resolution for the multi-carrier case according to an embodiment of the subject matter described herein.

As stated above, if LTE carrier aggregation is used, antennas designated to receive signals for specific signal carriers may receive control information carried for multiple different signal carriers. FIG. 3 is a block diagram illustrating the segregation of carrier specific processing resources within multi-UE simulator 100. Referring to FIG. 3, each receive signal chain processing resource 104, in addition to uplink/downlink control information segregation function 112 includes carrier control information segregation function 114. Carrier control information segregation function 114 separates control information for different carriers from the downlink signal and forwards carrier specific control information to the appropriate carrier specific DSP 106. Each uplink/downlink control information segregation function 112 may also separate the uplink and downlink control information for each carrier before the information is provided to the carrier specific DSP 106. Each carrier specific DSP 106 processes carrier specific control information. Thus, by processing the downlink signal to separate control information carried on different signal carriers and providing carrier specific information to the appropriate DSP 106, DSP resources can be organized on a carrier specific basis.

Figure 4:
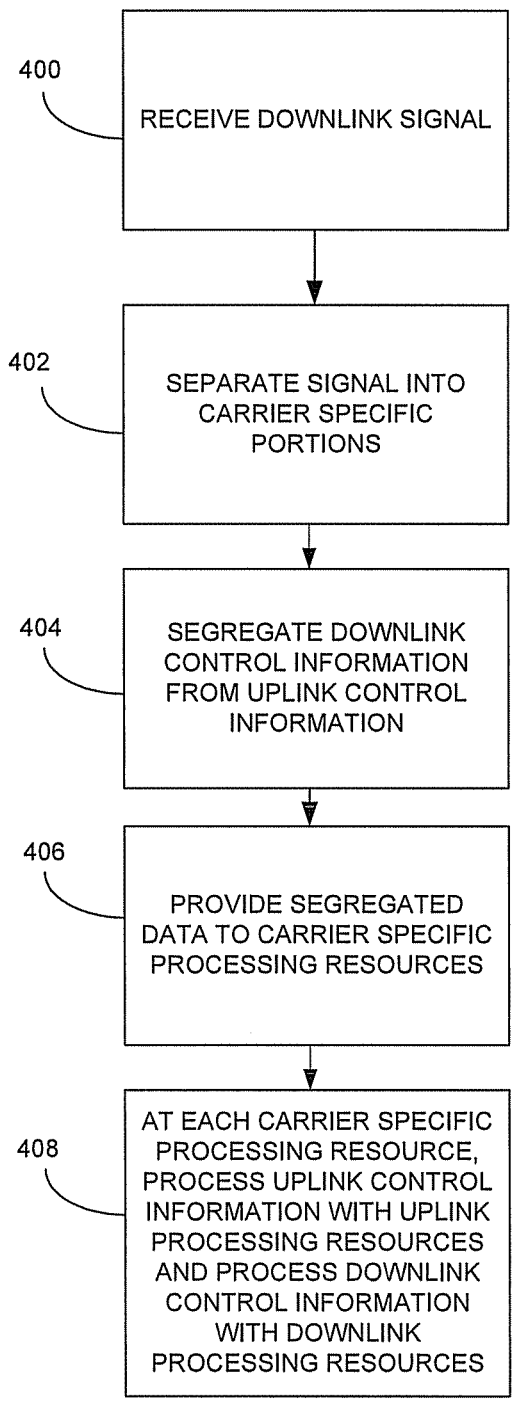
FIG. 4 is a flow chart illustrating exemplary overall steps for uplink and downlink control information resolution according to an embodiment of the subject matter described herein.

FIG. 4 is a flow chart illustrating exemplary steps for single and multi-carrier downlink and uplink control information resolution according to an embodiment of the subject matter described herein. Referring to FIG. 4, in step 400, a downlink signal including downlink control information and uplink control information is received. For example, LTE multi-UE simulator 100 may receive a downlink signal from an eNodeB under test. In step 402, the downlink signal is processed to separate control information for different carriers. For example, carrier control information segregation function 114 may separate the control information for different carriers in the downlink signal. In step 404, the control information carried on each carrier in the downlink signal is processed to segregate at least some of the downlink control information in the signal from uplink control information in the signal. For example, each uplink/downlink control information segregation function 112 may separate uplink control information, downlink control information, and unresolved control information for each carrier.

In step 406, the segregated downlink control information is provided to carrier specific processing resources. For example, uplink/downlink control information segregation function 112 may provide the segregated control information for each carrier to the appropriate carrier-specific DSP 106.

In step 408, the segregated uplink and downlink control information are respectively processed using uplink and downlink control information processing resources associated with each carrier specific processing resource. For example, uplink core 108 associated with each carrier specific DSP 106 may process the uplink control information, and downlink core 110 associated with each carrier-specific DSP may process the downlink control information. For DCIs with downlink channel information, downlink core 110 sends a resource mapping obtained from the DCI (i.e., frequency, modulation, data block size, etc.) to receive signal chain processing resources 104 so that receive signal chain processing resources 104 can decode the downlink data on the LTE physical downlink shared (PDSCH) channel. Uplink core 108 may determine, using the uplink control information, the resource mapping for the uplink signal and communicate the resource mapping for the uplink signal to carrier specific uplink channel processing resources (not shown in FIG. 1) so that the uplink signal can be correctly formed. Receive signal chain processing resources 104 may perform channel de-mapping or delineation of data for one or more UEs, demodulating, and/or rate de-matching.

Because the amount of control information required to be analyzed and processed by each core 108 and 110 is reduced, processing efficiency of simulator 100 with respect to both single and multi-carrier signals is increased. In addition, because downlink control information transmitted on different carriers is sent to the appropriate carrier specific processing resources, the processing efficiency of simulator 100 with respect to multi-carrier signals is further increased.

It will be understood that various details of the subject matter described herein may be changed without departing from the scope of the subject matter described herein.

Furthermore, the foregoing description is for the purpose of illustration only, and not for the purpose of limitation, as the subject matter described herein is defined by the claims as set forth hereinafter.

What is claimed is:

1. A method for downlink and uplink control information resolution, the method comprising:
   receiving a downlink signal including downlink control information and uplink control information;
   processing the downlink signal to segregate at least some of the downlink control information in the signal from the uplink control information in the signal, wherein processing the downlink signal includes identifying at least some control information that cannot initially be classified as uplink control information or downlink control information;
   processing the segregated downlink control information using downlink control information processing resources;
   processing uplink control information using uplink control information processing resources; and
   processing the information that cannot initially be classified uplink or downlink control information using the downlink control information processing resources and the uplink control information processing resources.

2. The method of claim 1 wherein the downlink signal comprises a long term evolution (LTE) downlink signal.

3. The method of claim 1 wherein receiving a downlink signal includes receiving a downlink signal having control information carried on multiple different signal carriers and wherein the method further comprises preprocessing the downlink signal to separate control information carried on different carriers and delivering carrier specific control information to carrier specific processing resources.

4. The method of claim 1 wherein processing the downlink control information includes using the downlink control information to obtain a resource mapping of the downlink signal.

5. The method of claim 1 wherein the uplink control information processing resources and the downlink control information processing resources comprise separate cores of a control digital signal processor (DSP).

6. The method of claim 3 wherein the carrier specific processing resources comprise separate digital signal processors (DSPs).

7. The method of claim 1 wherein segregating the uplink and downlink control information includes storing the uplink and downlink control information in different areas of memory.

8. The method of claim 1 wherein the steps are performed at a multi-UE simulator.

9. The method of claim 8 wherein the multi-UE simulator comprises a long term evolution (LTE) multi-UE simulator.

10. A system for downlink and uplink control information resolution, the system comprising:
    at least one interface for receiving a downlink signal including downlink control information and uplink control information;
    an uplink/downlink control information segregation function for processing the downlink signal to segregate at least some of the downlink control information in the signal from the uplink control information in the signal, wherein processing the downlink signal includes identifying at least some control information that cannot initially be classified as uplink control information or downlink control information;
    downlink control information processing resources for processing the segregated downlink control information and for processing the information that cannot initially be classified uplink or downlink control information; and
    uplink control information processing resources for processing the segregated uplink control information and for processing the information that cannot initially be classified uplink or downlink control information.

11. The system of claim 10 wherein the downlink signal comprises a long term evolution (LTE) downlink signal.

12. The system of claim 10 wherein the downlink signal includes control information carried on multiple different signal carriers and wherein the system further comprises a carrier control information segregation function for separating control information carried on different signal carriers in the downlink signal and for providing the carrier specific control information to carrier specific processing resources.

13. The system of claim 10 wherein the downlink control information processing resources are configured to determine a resource mapping of the downlink signal using the downlink control information.

14. The system of claim 10 wherein the uplink control information processing resources and the downlink control information processing resources comprise separate cores of a control digital signal processor (DSP).

15. The system of claim 12 wherein the carrier specific processing resources comprise separate digital signal processors (DSPs).

16. The system of claim 10 wherein segregating the uplink and downlink control information includes storing the uplink and downlink control information in different areas of memory.

17. The system of claim 10 comprising a multi-UE simulator, wherein the interface, the uplink/downlink control information segregation function, and the uplink and downlink control information processing resources are components of the multi-UE simulator.

18. The system of claim 17 wherein the multi-UE simulator comprises a long term evolution (LTE) multi-UE simulator.

19. A non-transitory computer readable medium comprising computer executable instructions embodied in a computer readable medium that when executed by a processor of a computer control the computer to perform steps comprising:
    receiving a downlink signal including downlink control information and uplink control information;
    processing the downlink signal to segregate at least some of the downlink control information in the signal from the uplink control information in the signal, wherein processing the downlink signal includes identifying at least some control information that cannot initially be classified as uplink control information or downlink control information;
    processing the segregated downlink control information using downlink processing resources;
    processing uplink control information using uplink control information processing resources; and
    processing the information that cannot initially be classified uplink or downlink control information using the downlink control information processing resources and the uplink control information processing resources.

* * * * *